(12) United States Patent
Jaubertie

(10) Patent No.: US 7,344,651 B2
(45) Date of Patent: Mar. 18, 2008

(54) METHOD FOR SELECTIVE REMOVAL OF MATERIALS PRESENT IN ONE OR MORE LAYERS ON AN OBJECT, AND APPARATUS FOR IMPLEMENTATION OF THIS METHOD

(75) Inventor: Yvon Georges Jean-Pierre Jaubertie, Paris (FR)

(73) Assignee: Workinter Limited, London (GB)

( * ) Notice: Subject to any disclaimer, the term of this patent is extended or adjusted under 35 U.S.C. 154(b) by 0 days.

(21) Appl. No.: 10/548,942

(22) PCT Filed: Mar. 14, 2003

(86) PCT No.: PCT/EP03/03247

§ 371 (c)(1),
(2), (4) Date: May 26, 2006

(87) PCT Pub. No.: WO2004/080656

PCT Pub. Date: Sep. 23, 2004

(65) Prior Publication Data

US 2006/0264153 A1 Nov. 23, 2006

(51) Int. Cl.
*B44C 1/22* (2006.01)
(52) U.S. Cl. .............................. 216/58; 216/59; 216/83; 134/6; 134/7
(58) Field of Classification Search .................. 216/58, 216/83, 59; 134/6, 7
See application file for complete search history.

(56) References Cited

U.S. PATENT DOCUMENTS

| | | | |
|---|---|---|---|
| 4,773,189 A | 9/1988 | MacMillan et al. | |
| 5,203,794 A | 4/1993 | Stratford et al. | |
| 5,261,191 A * | 11/1993 | Wick | 451/39 |
| 5,334,019 A | 8/1994 | Goldsmith et al. | |
| 5,505,749 A * | 4/1996 | Kirschner et al. | 51/309 |
| 2001/0027938 A1* | 10/2001 | Koebel et al. | 208/150 |

FOREIGN PATENT DOCUMENTS

| | | |
|---|---|---|
| DE | 195 22 001 | 1/1996 |
| EP | 0 612 585 | 8/1994 |
| WO | WO 98/40434 | 9/1998 |

* cited by examiner

*Primary Examiner*—Shamim Ahmed
(74) *Attorney, Agent, or Firm*—Michael Best & Friedrich LLP

(57) ABSTRACT

There is provided a method and apparatus for selective removal of materials present on an object A in one or more layers B by surface abrasion by projection onto the surface of the object A of a moving fluid composed of a gas and solid particles conveyed in the gas. The apparatus comprises at least two reservoirs (11,13,15) for solid particles (21,22,23) of at least two different sizes communicating with a single reservoir 30 trough conduits (24,25,26). Each conduit (24, 25,26) has an obturator (27,28,29) movable between open and closed positions and the single reservoir (30) is connected to a further conduit (36) provided with a nozzle (37) situated in the proximity of the surface layer B to be stripped. Particles (31) are mixed in "T" joint(34) with gas from an air compressor (35) and directed out of the nozzle (37). The average granulometry of the particles (31) is adjusted, by removing and/or adding other solid particles, so as to adapt the average granulometry of the particles (31)to the nature of the object A and/or the state of its surface.

19 Claims, 3 Drawing Sheets

METHOD FOR SELECTIVE REMOVAL OF MATERIALS PRESENT IN ONE OR MORE LAYERS ON AN OBJECT, AND APPARATUS FOR IMPLEMENTATION OF THIS METHOD

There exists a multitude of types of surface to be stripped, certain of which are relatively rough, and simple processes, well-known for many years, are then sufficient.

On the other hand, other surfaces require particular care and for these it is no longer acceptable to project materials which are very irregular, or very hard, or very aggressive, or very soiling.

One example which may be cited is the skin of the human body, which is being treated for therapeutic or aesthetic purposes, to remove its fine outer part. Another example is the surfaces of works of art: painted canvases, plans and drawings, manuscripts and parchments, frescos, wooden or mineral sculptures, painted or gilded, stained glass, porcelains, earthenware, gold and silver work, etc., as well as the facades of buildings, in particular to remove deposits, patinas and marks of time, stains, or graffiti from them.

Another field very different from those above is that of industry, where there are many cases requiring stripping, in particular for repair and cleaning purposes.

By way of example, printing cylinders having a very finely engraved surface and including very small cavities or channels which fill with ink and small impurities, and which require scrupulous cleaning which must both be complete and leave the printing surface intact.

Further examples are the structures of aircraft, the bodywork of competition cars and more generally any fragile or delicate structure which is covered by one or more layers of products which it is necessary to be able to subsequently remove, completely or layer by layer, this last condition supposing that it is possible to remove one layer without in any way damaging the one immediately beneath it.

This is the case for objects covered in the bare state with a coating or "under-layer", and then with one or more layers of paint, because it is necessary to be able to remove the paint but leave the intact coating in place.

The problem of the fine removal of materials deposited on an object is resolved overall by means of a fluid formed of a gas and solid particles, and moved in a stream guided by a conduit to an outlet nozzle situated in the proximity of the surface of the object.

It is known how to adjust the different geometric parameters of this stripping operation; for example, the velocity of the fluid, position of the nozzle, i.e. angle of attack and distance from the object, so that the particles strike the object more or less aggressively. Now, the applicant has established a correlation between the granulometry of the solid particles projected and the quality of the stripping obtained.

The present invention is based on this correlation and permits removal of materials to be effected which is adjustable to each particular case and, for the same case, control of the granulometry of the solid particles, both to maintain it at a predetermined given value and to vary it depending on the types of materials to be removed and on the characteristics of the object.

To this end, one aspect of the invention comprises a method for selective removal of materials present on an object in one or more layers by surface abrasion, by projection onto the surface of this object of a moving fluid composed of a gas and solid particles conveyed by said gas, including the steps of:

forming a reserve of solid particles, taking solid particles from this reserve and incorporating them in a stream of gas to form the moving fluid, directing this moving fluid through a conduit to an outlet nozzle situated in the immediate vicinity of the surface of the object, adjusting the average granulometry of the particles to be taken, either only by removal of solid particles present, or only by addition of other solid particles, or by combining such a removal and such an addition, in order to adapt this average granulometry of the particles to be taken to the nature of the object to be treated and/or the state of its surface.

According to another aspect, the invention comprises apparatus for selective removal of materials present on an object in one or more layers, by surface abrasion, by projection onto the surface of this object of a moving fluid composed of a gas and solid particles conveyed by said gas, comprising at least two reservoirs of solid particles of at least two different sizes communicating with a single reservoir through conduits, each of said conduits having an obturator mounted therein so as to be movable in adjustable manner between two extreme positions corresponding respectively to total closure and to complete opening of the corresponding conduit, said single reservoir being connected to a further conduit provided with a nozzle.

It must be made clear that in the present text, whether in the description or the claims, the words "size" and "granulometry" designate not a precise format of each particle, but a more or less broad range over which the granulometry extends between two limits of a range.

In fact, the Man skilled in the Art knows that, in spite of the most efficient means that may be used, obtaining a granulometry of relatively fine particles cannot be perfect, since it is obtained from between two limits, high and low respectively.

Other characteristics of the invention will become apparent from the detailed description below, made with reference to the attached drawings. The invention will now be described by way of example with reference to the accompanying drawings, in which.

With the example shown, the method provides for the presence of a reserve, or stock, 1 of solid particles of a granulometry extending over a fairly wide range, which could correspond to the practically complete passage of all the stock 1 through a 10 mesh screen, and, by convention, it is considered in the present description that the solid particles corresponding to this wide mesh are particles of large size or diameter.

Generally, the supplier of solid particles having made a break at each end of a wide range indicates a granulometry extended between two extreme values of granulometry which are fixed, in the present description, at 10 and 100 mesh, so that the stock 1 also contains solid particles of smaller size or diameter than 10 mesh which, naturally, pass freely through a wide mesh.

In practice, this stock is used from bulk, i.e. as it is, without a size break between the two extreme mesh values, from 10 to 100 mesh.

Naturally, it is permissible to provide solid particles the sizes of which extend over much closer values, but it is still a single stock having a single average size.

The present invention sets aside this simple solution in the case of very fine stripping of materials present on an object in one or more layers and where very high quality work is involved.

One example is the stripping of aircraft which consists of removing paint through one or more layers while leaving intact the protection applied to the metal surface, such as anodic oxidation, passivation and others.

The layers of materials in question have a thickness measured in microns and it will be understood that it is difficult to precisely select the removal in a single pass of exactly one layer, or of two layers simultaneously and just as exactly.

The invention allows a result of such precision to be obtained by managing in a certain manner the degree of attack of a surface by means of the stripping fluid, depending on the granulometry of the solid particles.

Figure 1:
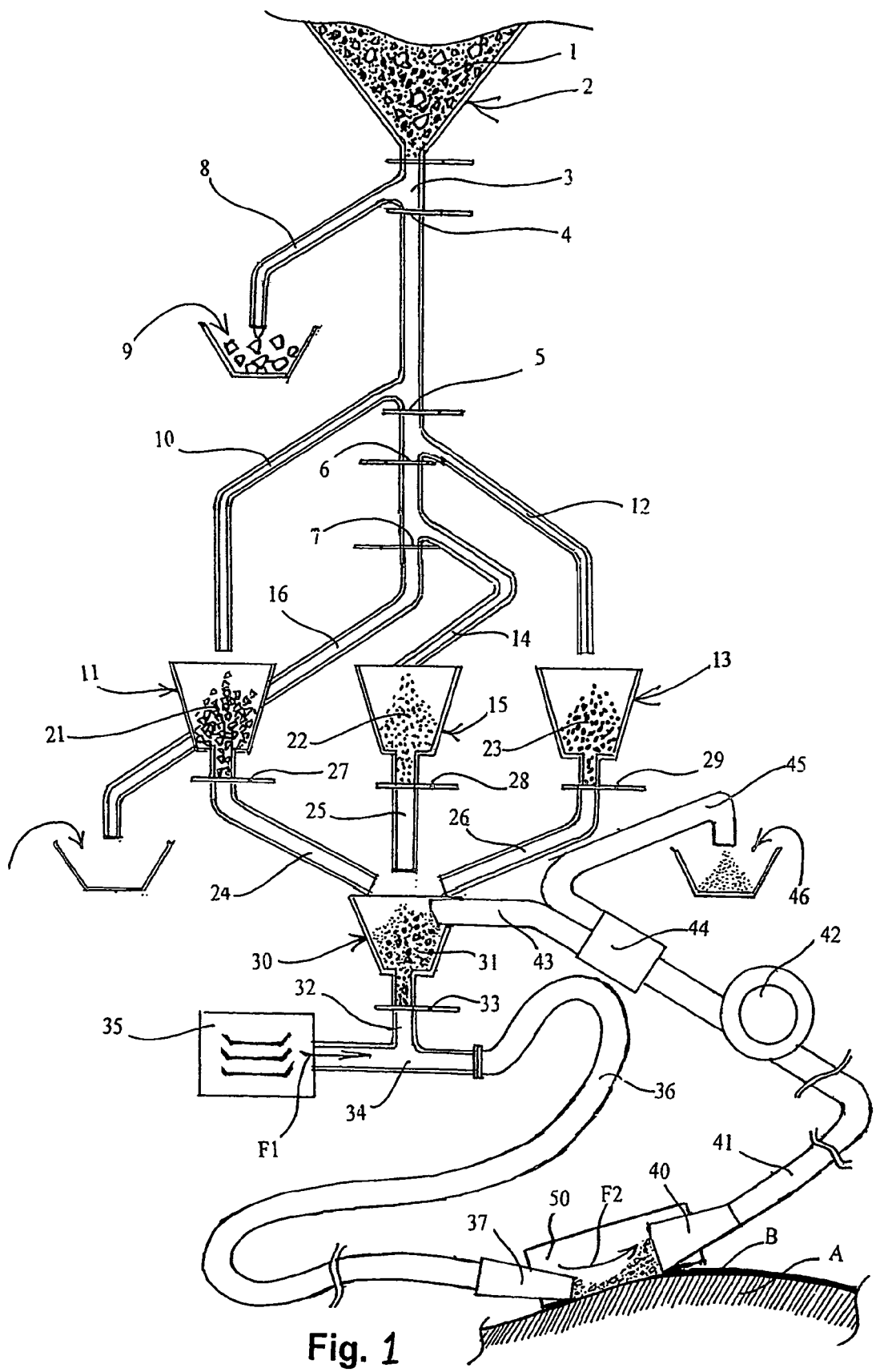
FIG. 1 is a schematic view showing an embodiment of the invention, in accordance with an example providing availability of solid particles of three different granulometries.

This is why FIG. 1 shows a single tank for the stock 1, i.e. a hopper 2 communicating with an outlet conduit 3 and having to receive a stock of solid particles of granulometry extending over a wide range from 10 to 100 mesh.

In the outlet conduit 3 are arranged from upstream to downstream (i.e. from top to bottom) four successive screens of different mesh, i.e. a 12 mesh screen 4, a 30 mesh screen 5, a 50 mesh screen 6 and an 80 mesh screen 7.

The screen 4 stops all the solid particles of which the size is greater than 12 mesh and which are removed through a conduit 8 to a recovery site symbolised by the reference 9, either to be eliminated or to be stored and subsequently retrieved for other tasks.

The particles passing therefore have a size between 12 to 100 mesh and reach the screen 5 which stops all the solid particles of which the size is greater than 30 mesh. These are extracted and directed through a conduit 10 to a storage tank formed by a hopper 11, which consequently contains solid particles having a granulometry corresponding to 12 to 30 mesh.

The passing particles therefore have a size between 30 to 100 mesh and reach the screen 6 which stops all the solid particles of which the size is greater than 50 mesh. These are extracted and directed through a conduit 12 to a storage tank formed by a hopper 13 which, consequently, contains solid particles of which the granulometry corresponds to 30 to 50 mesh.

The passing particles therefore have a size between 50 to 100 mesh and arrive at the screen 7 which stops all the solid particles of which the size is greater than 80 mesh. These are extracted and directed through a conduit 14 to a storage tank formed by a hopper 15 which, consequently, contains solid particles of which the granulometry corresponds to 50 to 80 mesh.

The passing particles therefore have a size smaller than 80 mesh and, with the present example, up to 100 mesh. They are evacuated through a conduit 16 to a recovery site symbolised by the reference 17, either to be eliminated or to be stored and subsequently retrieved for other tasks.

In the interests of simplification, the detail of the mechanical functioning of the screening and cutting operation which has just been described has not been shown, in particular prevention of clogging of the screens and their replacement, vibration, extraction of the retained particles, evacuation of the eliminated particles, control of the valves, distributors and slide-valves for opening-closing the conduits, etc., as all this is within the scope of the Man skilled in the Art, knowing the technology of particles having to be sorted according to their granulometry.

Similarly, no detail has been given of the complementary operations, such as homogenisation of the different granulometric fractions, which require mixers, for example, and distribution slide valves, these arrangements also being within the scope of the Man skilled in the Art.

Breaks are thus made which allow the formation in three separate hoppers 11, 13 and 15 of three reserves 21, 22 and 23 of solid particles in accordance with three brackets of granulometry, of size corresponding to 12 to 30 mesh, 30 to 50 mesh and 50 to 80 mesh, respectively.

Each of the hoppers 11,13 and 15 communicates with an outlet conduit 24, 25 and 26, respectively, provided with a closure mechanism or obturator 27, 28 and 29 and opening over a single same tank formed by a hopper 30.

It will be remembered that FIG. 1 is a schematic view which is required to be simplified, for quick understanding, but that in reality an installation in accordance with the invention is more elaborate.

In particular, hopper 30 can be a pressurised and closed reservoir, so that the hoppers 11, 13 and 15 do not pour by gravity and directly into the hopper 30, but into an intermediate storage hopper (not shown) which cyclically refills the reservoir when the quantity of particles which it contains reaches a lower limit. Then, the reservoir is depressurised and is refilled from the intermediate hopper, the operation of the corresponding valves obviously being able to be automatic.

The reserve of solid particles 31, which the reservoir, or hopper, 30 contains, has an average granulometry which depends on the proportions in accordance with which this reserve 31 has been formed from the reserves 21, 22 and 23.

An installation has just been described permitting preparation of a reserve of solid particles of required granulometry, adjustable to different stripping work.

If the user has directly available a stock of particles divided into parts having the correct basic granulometries, for example bags of particles of the sizes 12 to 30 mesh, 30 to 50 mesh and 50 to 80 mesh respectively, the operations described above and occurring upstream of the hoppers 11, 13 and 15 are not required, as it is sufficient to load these hoppers by pouring into them the bags of solid particles having the size corresponding to the hopper.

The hopper 30 communicates with an outlet conduit 32 provided with a closure mechanism or obturator 33 and leading to a "T", joint 34 connected on the one hand to a compressed gas source such as an air compressor 35 and on the other to a conduit delivering gas-solid particles fluid 36. This conduit 36 ends in an outlet nozzle 37 situated in the proximity of the surface of the object A to be stripped when the installation is operating.

When it is required to recycle the solid particles after they have struck the object A to remove at least a part of the materials B which cover its surface, an aspirator 40 is arranged situated at the end of an extraction pipe 41 connected to the intake of a suction-forcing pump 42, the delivery of which is connected to a return conduit 43 the end of which opens over the upper level of the reserve 31 situated in the hopper 30.

The operation of the installation which has just been described is as follows:

Having taken into consideration the type of materials B to be removed and the characteristics of the object A and its surface, the granulometry of the reserve 31 is determined and this reserve 31 is formed from the primary reserves 21, 22 and 23 by operating one or more of the obturators 27, 28 and/or 29 in order to take the required quantities of solid particles and homogenise them into a coherent whole.

Then, the installation is started by setting in motion the gas which conveys the solid particles, which is accomplished here by starting the compressor 35 and its output in the direction of the arrow F1 in the joint 34, while the opening of the obturator 33 is initiated to release a descending current of solid particles, the gas and the solid particles which it conveys together forming the stripping fluid in accordance with the invention.

This fluid leaves the nozzle 37 forcefully, strikes the surface of the object A and, by abrasion, each solid particle detaches a fragment of the materials B, as described below.

The solid particles rebound from the surface of the object A and are sucked up by the aspirator 40 in the direction of the arrow F2 to pass along the pipe 41 and return into the hopper 30 through the return conduit 43, by means of the pump 42.

In practice, the nozzle 37 and the aspirator 40 are placed in an enclosure 50, open at its lower part and applied in tight or sealed manner to the object A to be treated.

In the return circuit 40-41-42-43, the average granulometry of the recovered solid particles is determined by measuring and checking means of known type (not shown), in order to determine the granulometry differential between that required for the work in question and that of the recovered particles and, depending on the results of this check, one or more of the obturators 27-28-29 is operated to correct the average granulometry of the reserve 31.

In a closed circuit as shown: hopper 31, conduit 32, joint 34, conduit 36, nozzle 37, aspirator 40, pipe 41, pump 42 and return conduit 43, there is a certain quantity of solid particles and on continuous operation of the installation, two phenomena are found which may interfere with the proper performance of the work undertaken and which are controlled in accordance with the invention. These are:

(1) there is a loss of solid particles which is of the order of 5% at each cycle, i.e. for each pass having used the whole of the reserve 31, and (2) there is a reduction in the size of the solid particles, the average granulometry of which decreases.

As indicated above, the invention provides for closer control of the granulometry of the solid particles used to a reference value, so that it is necessary not only to determine the original granulometry but also to ensure its maintenance by correcting the average granulometry of the reserve 31.

Operation of the obturators 27, 28 and 29 is therefore modulated not only to restore the original granulometry, but also to restore the required quantity, due to which the quality of the work carried out on the object A is at the required highest level and, moreover, constant.

To maintain the original granulometry while the reserve 31 is depleted in large size particles and augmented in small size particles, it could be thought sufficient to add particles from the reserves 21 and/or 23, but that only effects the proportions of the different granulometries and not the absolute number of fine particles.

Consequently, it is desirable to be able to effect the adjustment of the average granulometry of the reserve 31 not only by addition of particles but also by withdrawal.

This withdrawal arising essentially from an excess of fine particles returning into the reserve 31 through the return circuit, FIG. 1 shows a diversion box 44, to the intake of which the extraction pipe 41 leads and comprising two outlets to which are connected on the one hand the return conduit 43 and on the other an evacuation conduit 45.

The diversion box 44 contains a distribution slide-valve with adjustable position, permitting diversion of a certain proportion of solid particles which are evacuated through the conduit 45 to a recovery site symbolised by the reference 46, either to be eliminated, or to be stored and subsequently retrieved for other tasks.

The position of the distribution slide-valve allows adjustment of the proportion of solid particles directed to the return conduit 43 and those which are directed to the evacuation conduit 45 for elimination.

In reality, the aspiration and separation of the particles is effected by means of a single apparatus of the type known by the name "cyclone" (not shown) which on the one hand creates the depression required for the return of the particles through the conduit 41 and on the other hand causes separation of the particles into two categories: the fine particles are evacuated at the upper part of the cyclone through the conduit 45 and the denser particles are recovered at the lower part of the cyclone and return to the hopper 30 through the return conduit 43.

In energetically striking the surface to be stripped, the particles fragment, but for all that do not change shape, their surfaces always having as many points and sharp edges, for which reason they can be reused.

In other words, they become smaller but do not become blunted.

The flexibility of the particles containing water has the effect that, by elastic deformation on impact, the particles can reach the bottoms of very small cavities and miniscule channels, these micro cavities being in particular present on printing cylinders for example.

It must be stated that the particles recovered and travelling in the return circuit are charged with impurities, since they take up the fragments of the material or materials B removed from the object A. Consequently, if they have to be relieved of this waste for their reuse, it is necessary to provide in the return circuit a sorting and cleaning device, which has not been shown as it is within the scope of the Man skilled in the Art.

Figure 2:
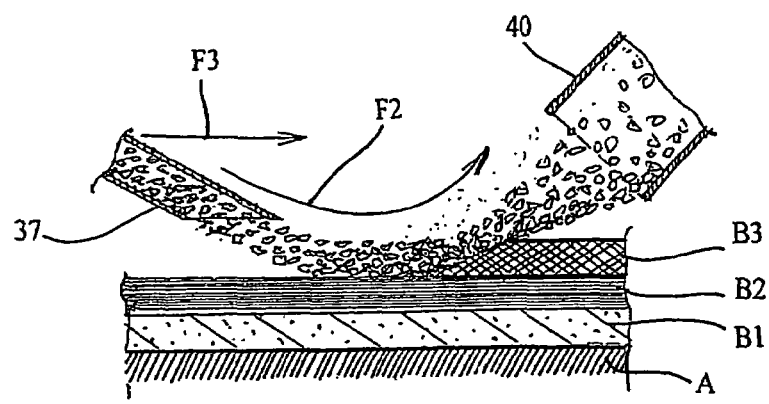
FIG. 2 is a schematic view showing the application of the method of the invention using particles of large size.
Figure 3:
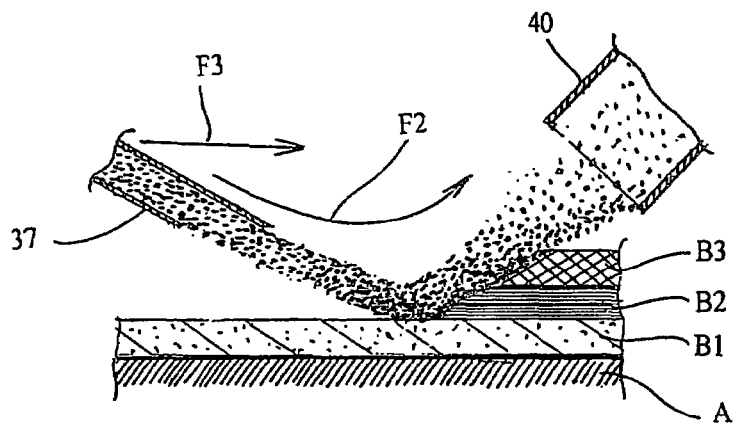
FIG. 3 is a schematic view showing the application of the method of the invention using particles of medium size.
Figure 4:
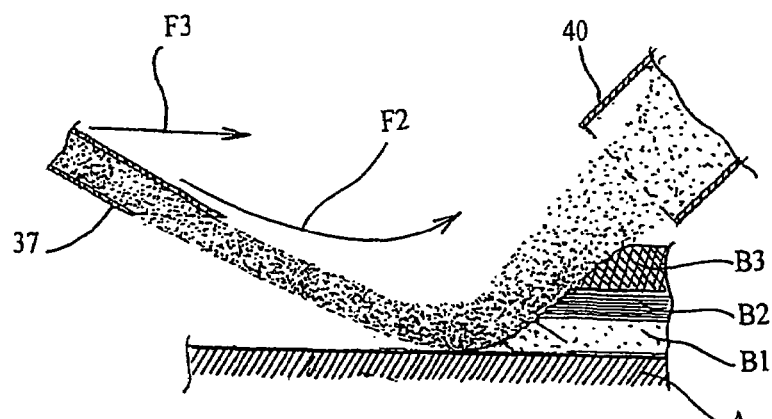
FIG. 4 is a schematic view showing the application of the method of the invention using particles of small size.

Referring now to FIGS. 2 to 4, these show a schematic representation of the phenomenon employed by the invention.

Up to now, reference has been made to a single parameter of granulometry, but it must be stated that the reason for this is that it is difficult to individually control two other major physical characteristics of solid particles other than by granulometry.

These two physical characteristics are, for each solid particle:

its degree of hardness, and the number and arrangement of its surface unevenness or asperities.

In order to have the benefit of a possibility of controlling the degree of hardness of the particles, a hydrophilic substance is selected as substrate for production of the solid particles, so that each particle contains a certain quantity of water.

Such a substrate may be formed from sawdust, or may be formed by a starchy polymer such as that obtained from wheat starch.

This product permits formation of a projectable medium which lends itself particularly well to the stripping of delicate surfaces, and which may be the one forming the subject of U.S. Pat. No. 5,066,335.

The particles of this product have a hardness less than that of aluminium and therefore do not attack this metal. Also, they do not attack glass.

Their hardness is inversely proportional to their size, i.e. to their diameter, measured as passing through a screen characterised by its mesh number.

Thus, particles of large diameter (passing through a screen of the order of 10 to 30 mesh) are relatively soft and cause a less offensive impact, so that this granulometry is selected for delicate work, or to remove a material which is relatively soft or has relatively weak adherence to the surface of the object A, or to preserve a layer situated beneath that which must firstly be removed, as shown in FIG. 2.

The flexibility of the particles has the advantage that only a small transfer of energy takes place from the particles to the substrate to be treated, so that there is a small rise in temperature of the latter, for example, and no peen forming occurs on the treated object.

FIG. 2 shows that the stripping fluid (composed of the driving gas and solid particles) arrives with force through the nozzle 37 positioned at a small distance from the surface of the object A here covered with materials B in three layers, the first B1 arranged directly on the object A, the second B2 applied on the first and the third B3 covering the previous one, forming the visible layer.

It may be for example, a coating B1, paint B2 and a varnish B3.

The nozzle 37 is oriented at a given angle allowing the particles to attack the layer B3 as efficiently as possible.

It will be observed that the solid particles are of large diameter, i.e. they correspond to the granulometry of the single reserve 21.

Due to their size, the solid particles contain proportionally a lot of water and are therefore relatively soft, so that they only remove the single layer B3, layers B2 and B1 remaining in place.

To remove the whole of layer B3, there has to be a relative displacement of the nozzle 37 and the object A, and it is supposed here that the nozzle 37 is displaced in the direction of the arrow F3 relative to the immobile object A.

When a closed circuit is used, the aspirator 40 must, of course, follow this movement and move back progressively as the nozzle 37 advances.

The rate of progress of the nozzle 37 in the direction of the arrow F3 is set as a function of the efficiency obtained by the solid particles of this diameter, and if it is required only to remove the layer B3, the rate of progress will be relatively high.

If, on the contrary, it is required with particles of the same granulometry to remove layers B3 and B2 simultaneously, the rate of progress will have to be lower.

FIG. 3 shows another situation, which is that of work consisting of removing the two surface layers B3 and B2 in one single pass and fairly quickly, in which case a finer granulometry is selected for the solid particles than previously, and which could correspond to that of reserve 23.

The solid particles are less large than before and therefore contain less water, so that they are harder and more efficient. Supposing that the nozzle 37 progresses at the same rate as that described with regard to FIG. 2, it may be supposed that the solid particles of this intermediate granulometry will be more aggressive and will take up the materials of the two layers B3 and B2, this rate this time being adjusted so that the layer B1 remains intact.

With reference now to FIG. 4, it will be seen that this shows a third situation which is that of work consisting of removing the three layers B3, B2 and B1 in a single pass and fairly quickly, in which case a fine granulometry is selected for the solid particles, which could correspond to that of reserve 22. The solid particles are the finest of the example shown in FIG. 1, and they contain still less water, so that they are the hardest of the example used.

Supposing that the nozzle 37 still progresses at the same rate, it may be supposed that the solid particles of this fine granulometry will be the most aggressive and will take up the materials of the three layers B3, B2 and B1, this rate this time being adjusted so that the surface of the object A is bared.

It will be understood that the smaller the solid particles are, the less water they contain, the harder they are and the better the efficiency calculated in action time per square metre.

However, conversely, the larger the solid particles are, when they are formed from wheat starch, the more they have asperities and points and it could be thought that their aggressive shape would compensate for their softness.

In fact, experience shows that the overall efficiency of the solid particles is, broadly speaking, a function of granulometry, for if the large particles have more points, they are also less numerous for passage through the section of the nozzle 37.

Consequently, it will be remembered that the efficiency of the fine solid particles is greater than that of the medium solid particles and a portion of the large particles.

The rapid removal of a whole layer may therefore be effected in one single pass.

The description above shows that the rate of progress of the nozzle 37 and the granulometry of the solid particles can be combined according to the work to be carried out and on the circumstances: fragility or conversely robustness of the object A, weak or strong adherence of the layers to be removed, respect of the base layer or laying bare of the surface of the object A, etc.

Figure 5:
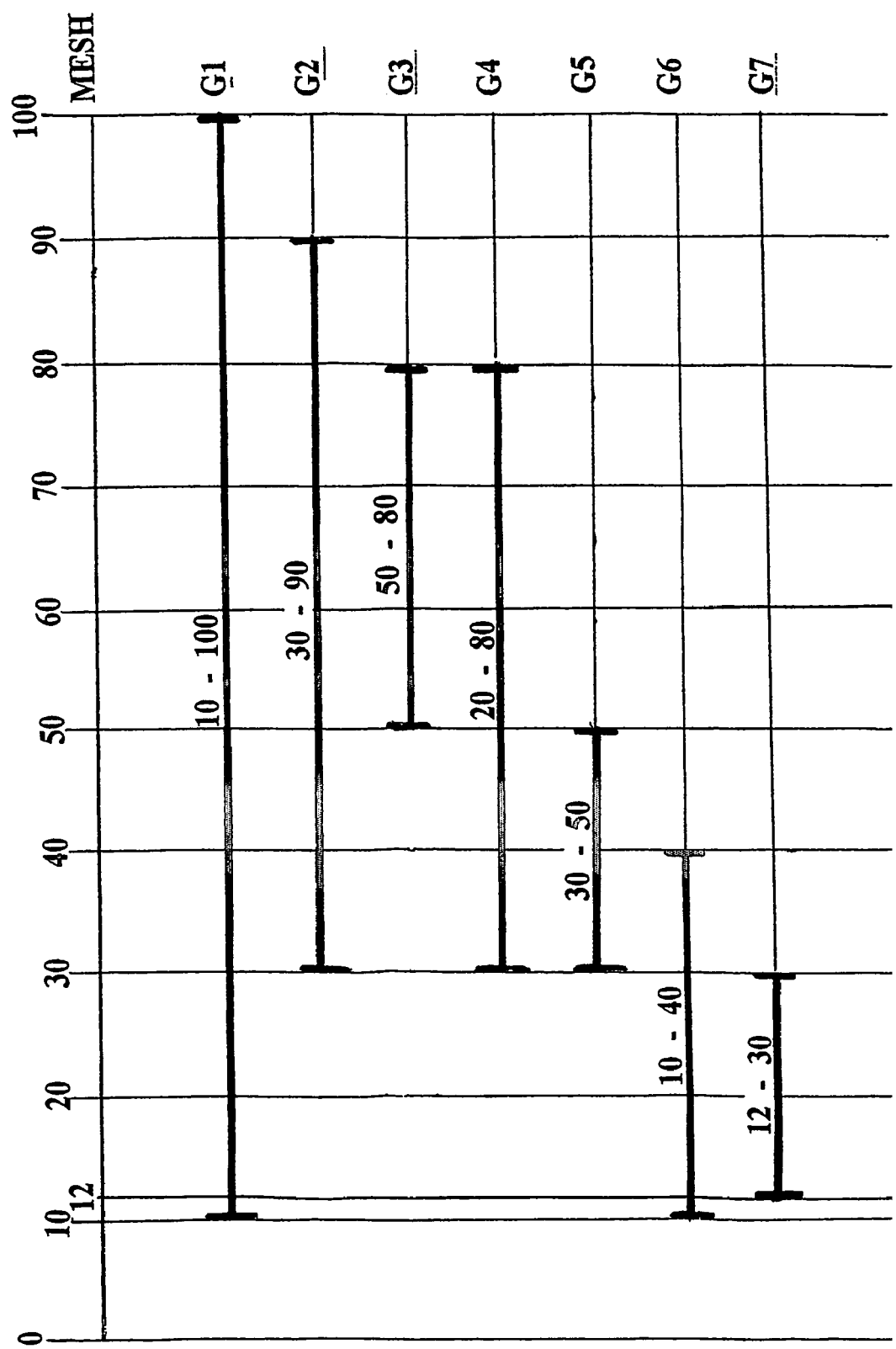
FIG. 5 is a diagram showing the recommended ranges for the meshes of the screens to be used to determine the granulometries of solid particles well suited to the removal of delicate materials associated with surfaces which are themselves fragile.

By way of example, FIG. 5 shows a diagram of the different granulometries to which reference has been made in the above description. The different granulometric ranges used are identified by the letter "G" followed by an order number:

G1 is that which extends from one end to the other, and continuously, of the useful range of fineness of the screens, measured in mesh. Here it is considered, without this being in any way limiting, that the finest useful granulometry is at least equal to that which passes through a 10 mesh screen, while the coarsest corresponds to that which passes through a 100 mesh screen.

G2 corresponds to the 30 and 90 mesh screens.

G3 corresponds to the 50 and 80 mesh screens. This is the example used for reserve 22.

G4 corresponds to the 30 and 80 mesh screens.

G5 corresponds to the 30 and 50 mesh screens. This is the example used for reserve 23.

G6 corresponds to the 10 and 30 mesh screens.

G7 corresponds to the 12 and 30 mesh screens. This is the example used for reserve 21.

These granulometries have been used for industrial stripping work, i.e. aircraft, competition cars, printing cylinders.

This is therefore an example allowing the invention to be illustrated in concrete manner, but which is not limiting, for other granulometries can prove necessary for other applications, such as the removal of graffiti, restoring wall frescos, treatment of the human skin, etc.

The process in accordance with the invention may be implemented with a mobile device, in particular driven by a powerful machine in the case of stripping objects of large dimensions, such as aircraft.

It may also be used in a cabinet into which the objects to be stripped are introduced.

The single tank 30 and the primary tanks 11, 15 and 13 may therefore be more or less close to each other, connected by rigid or flexible conduits and, of course, may have very different volumes depending on the applications.

The invention claimed is:

1. Method for selective removal of materials present on an object in one or more layers by surface abrasion, by projection onto the surface of this object of a moving fluid composed of a gas and solid particles conveyed by said gas, including the step of:

forming a single same reserve of solid particles from at least two primary reserves of different respective basic bracket of granulometry, taking solid particles from this single same reserve and incorporating them in a stream of gas to form the moving fluid, directing this moving fluid through a conduit to an outlet nozzle situated in the immediate vicinity of the surface of the object, recovering at least a part of the solid particles after they have struck the surface of the object, directing the recovered particules to the single same reserve, measuring the average granulometry of these recovered particles on their arrival in the single same reserve and, either only by removal of solid particles from the recovered particles, or only by addition of other solid particles taken from at least one primary reserve, or by combining such a removal and such an addition, adjusting, in the single same reserve, the average granulometry of the particles to be taken, depending on the granulometry of the particles present in the single same reserve after incorporation of the recovered particles, in order to control the average granulometry of the particles to be drawn from the single same reserve, to the nature of the object to be treated and/or the state of its surface.

2. Method according to claim 1, wherein by addition and/or removal, the average granulometry of the particles present in the single same reserve is returned to its original value after incorporation of the recovered particles.

3. Method according to claim 1, wherein the average granulometry of the particles present in the reserve is controlled depending on the force required for abrasion, this force being inversely proportional to the size of the solid particles.

4. Method according to claim 1, wherein the granulometry of the solid particles is that which corresponds to the passage of the particles through a screen of between 10 and 100 mesh.

5. Method according to claim 1, wherein the granulometry of the solid particles is that which corresponds to the passage of the particles through a screen of between 30 and 90 mesh.

6. Method according to claim 1, wherein the granulometry of the solid particles is that which corresponds to the passage of the particles through a screen of between 20 and 80 mesh.

7. Method according to claim 1, wherein the granulometry of the solid particles is that which corresponds to the passage of the particles through a screen of between 30 and 80 mesh.

8. Method according to claim 1, wherein the granulometry of the solid particles is that which corresponds to the passage of the particles through a screen between 30 and 50 mesh.

9. Method according to claim 1, wherein the granulometry of the solid particles is that which corresponds to the passage of the particles through a screen of between 10 and 40 mesh.

10. Method according to claim 1, wherein the granulometry of the solid particles is that which corresponds to the passage of the particles through a screen of between 12 and 30 mesh.

11. Method according to claim 3, wherein three reserves of solid particles are formed, the first reserve corresponding to a granulometry corresponding to the passage of the particles through a screen of between 12 and 30 mesh, the second reserve to a granulometry corresponding to the passage of the particles through a screen of between 30 and 50 mesh and the third reserve to a granulometry corresponding to the passage of the particles through a screen of between 30 and 80 mesh, the solid particles of these three reserves being able to be taken selectively so as to be any one of these three granulometries alone, or a mixture of at least two of these three granulometries.

12. Method according to claim 1, wherein the particles are formed of a hydrophilic substance and contain water.

13. Method according to claim 12, wherein the particles consist of sawdust.

14. Method according to claim 12, wherein the particles consist of a starchy polymer.

15. Method according to claim 14, wherein the starchy polymer is from a cereal such as wheat or maize.

16. Apparatus for selective removal of materials present on an object in one or more layers by surface abrasion, by projection onto the surface of this object of a moving fluid composed of a gas and solid particles conveyed by said gas in a required granulometry, comprises:

at least two primary reservoirs for solid particles of respective basic bracket of granulometry, the particle basic bracket of granulometry of one reservoir differing from the other, and communicating with a single reservoir through conduits, each of said conduits having an obturator mounted therein so as to be movable in an adjustable manner between two extreme positions corresponding respectively to total closure and to complete opening of the corresponding conduit;

a nozzle connected to the single reservoir by a conduit;

a return conduit opening over the single reservoir for recovering particles after they have struck the surface of the object;

measuring and checking means to determine the granulometry differential between the granulometry of the recovered particles and the required granulometry; and diversion means for removing solid particles from the recovered particles and/or obturators for adding other solid particles taken from at least one primary reservoir, to control the average granulometry of the particles to be drawn from the single reservoir to the nature of the object to be treated and/or the state of its surface.

17. Apparatus according to claim 16, including a device for recovery of at least a part of the particles previously projected through the nozzle and comprising an aspirator, an extraction pipe and a suction-forcing pump.

18. Apparatus according to claim 17, wherein the extraction pipe communicates with the return conduit, a free end of which opens over the single reservoir.

19. Apparatus according to claim 18, wherein the extraction pipe leads to a diversion box containing a distributor slide-valve and connected on the one hand to the return conduit and on the other to an evacuation conduit.

* * * * *